United States Patent [19]

Crowle

[11] 3,829,711

[45] Aug. 13, 1974

[54] SHIFT REGISTERS

[75] Inventor: Brian Crowle, Dorchester, Dorset, England

[73] Assignee: Integrated Photomatrix Limited, Dorchester, Dorset, England

[22] Filed: Oct. 2, 1972

[21] Appl. No.: 294,182

[30] Foreign Application Priority Data

June 10, 1971 Great Britain ................. 46455/71

[52] U.S. Cl. ................ 307/221 c, 307/251, 307/279

[51] Int. Cl. ............................................ G11c 11/40

[58] Field of Search ........ 307/221 C, 221, 304, 251, 307/279; 330/151, 35, 18

[56] References Cited

UNITED STATES PATENTS

| | | | |
|---|---|---|---|
| 3,745,371 | 7/1973 | Suzuki | 307/221 C |
| 3,746,913 | 7/1973 | Gianopulos | 307/221 C |

FOREIGN PATENTS OR APPLICATIONS

| | | | |
|---|---|---|---|
| 202,729 | 6/1970 | Germany | 307/221 |

*Primary Examiner*—John S. Heyman

*Attorney, Agent, or Firm*—Burns, Doane, Swecker & Mathis

[57] ABSTRACT

A shift register stage comprises first and second amplifying elements each constituted by first and second metal-oxide-semiconductor (MOS) transistors connected in series. In each amplifying element, the gate of the first transistor constitutes an inverting signal input, the gate of the second transistor constitutes a non-inverting signal input, a current carrying electrode of the second transistor constitutes a current input and the junction between the transistors constitutes an output. The inverting signal input of the first element serves as a data input and is connected to a gate means in the form of a further MOS transistor for controlling the application of a data signal to said inverting signal input. The inverting signal input of the first element is connected to the non-inverting signal input of the second element and the output of the first element is connected to the inverting signal input of the second element whose output constitutes the output of the stage. In a shift register using a plurality of such stages, the output of each stage is connected to the gate means of the succeeding stage.

8 Claims, 9 Drawing Figures

SHIFT REGISTERS

This invention relates to shift registers and stages thereof. The invention also relates to logic circuits for use in such shift register states and to photo-diode scanning arrangements using such shift registers.

A shift register comprises a number of similar elements, generally known as "shift bits," or "bits," or "stages," which last term we shall use hereinafter. Usually, each stage possesses the following inputs and outputs:

i. one or more pairs of "supply current" inputs to be connected to one or more sources of supply of direct current (power supplies).

ii. a "data" input, which can be in one of two potential states, namely, "low" (logic 0) or "high" (logic 1).

iii. one or more "data" outputs, each with two potential states, "low" (logic 0) or "high" (logic 1).

iv. one or more "clock pulse" inputs, which are to be connected to sources of supply which change in potential with time.

The operation of a state is such that, if the data input node is in one of the two logic states mentioned above, and if a fixed sequence of potential states is applied to the clock pulse inputs, the data output node attains the same logic state as the data input node irrespective of its state previous to the clock pulse sequence.

Previously known designs of shift register stages have generally involved the use of at least two inverting amplifier circuits. Under quiescent conditions, one or other of these circuits will draw a certain amount of current from the d.c. supplies (i) above, or from the clock pulse inputs (iv) above. Thus, a shift register containing *n* stages will draw *n* times this amount of current. This is often undesirable since it causes much power to be dissipated in the register, thereby raising the temperature. If steps are taken in the design of the register to reduce the quiescent current in each stage, the result is usually a lower maximum operating speed, which may be unacceptable.

The present invention provides a logic circuit for use in a shift register stage, including first and second amplifying elements each of which has an inverting signal input, a non-inverting signal input, a supply current input and an output, in which circuit the output of the first element is connected to the inverting signal input of the second element and the inverting signal input of the first element is connected to the non-inverting signal input of the second element.

The invention also provides a shift register stage including first and second amplifying elements each of which has an inverting signal input, a non-inverting signal input, a supply current input and an output, in which register stage the output of the first element is connected to the inverting signal input of the second element, the inverting signal input of the first element is connected to the non-inverting signal input of the second element, and the inverting signal input of the first element which serves as a data input is connected to gate means operative to control the application to such signal input of a data signal to be shifted through the stage, the stage data output being the output of the second element.

When used in this way, under certain operating conditions current will only be drawn by an amplifying element of the register stage when both signal input of that element are at a high potential (logic 1 state) and if the non-inverting signal input of the first element is connected to a source of high potential then, if the inverting signal input of the first element is low, the output of the first element is high, and the output of the second element is low (logic 0) permitting current to be drawn by neither element, whilst if the inverting signal input of the first element is high the output of such element is low and the output of the second element is high permitting current to be drawn by the first element.

In one form of shift register stage embodying the invention a control electrode of the gate means and the non-inverting signal input of the first element are both connected to receive a series of clock pulses at a predetermined level of potential, and the current input of each element is connected to source of constant potential at the predetermined level.

In another form of shift register stage embodying the invention a control electrode of the gate means and the non-inverting signal input of the first element are both connected to receive a first series of clock pulses at a predetermined level of potential, the current input of the second element is connected to receive a second series of clock pulses at the predetermined level of potential and in non-overlapping relationship with the pulses of the first series, and the current input of the first element is connected to a source of constant potential at the predetermined level.

In a third, preferred form of shift register stage, a control electrode of the gate means, the non-inverting signal input of the first element and the current input of the first element are all connected to receive a first series of clock pulses at a predetermined level of potential, and the current input of the second element is connected to receive a second series of clock pulses at the predetermined level of potential and in non-overlapping relationship with the pulses of the first series.

In a further aspect, the invention provides a shift register including a plurality of stages according to the invention, the data output of each stage being connected to the gate means of the succeeding stage.

Conveniently, each of the amplifying elements includes a pair of MOS transistors connected in series.

Preferably, capacitive means is connected between the output of the second amplifying element and the non-inverting signal input thereof to provide positive feedback from the said output to the said non-inverting input.

Advantageously, a single register stage or a plurality of stages having their output(s) connected to the gate means of one or more succeeding stages(s) and their gate means connected to the output(s) of one or more preceeding stages may be formed as an integrated circuit.

Embodiments of the invention provide a shift register stage wherein current is only drawn from a supply by the stage while a pulse is shifted through such stage.

This arrangement provides the advantage that only those stages of the shift register carrying a potential significant of an input potential (logic 1) draw any substantial current from the supply. In conventional registers all stages draw current. Thus, if a single pulse (logic 1) is to be transferred through a register consisting of one hundred stages then, for a given maximum operating speed, a register according to the invention would dissipate only about 1% of the power required to operate such conventional register. Clearly, if more logic 1 output states appear in the register, more power is required, until, in the limiting case, when the whole register is filled with logic 1 output stages, and each stage is conducting, the consumption is comparable to a conventional design with the same maximum speed capability.

Thus, a shift register including logic elements according to the invention would seem to be of most value in applications in which a single logic 1 output stage is required to be propagated through a register in which all the other output states are at logic 0. One such application is in an arrangement for sequentially scanning a linear array of photo-diodes and the invention provides such an arrangement employing a shift register according to the invention, each stage of the register having its data output connected to a respective switch device responsive to a change of the potential of the data output to apply a signal from a respective photo-diode to a common output rail for the photo-diode signals.

In order that the invention may be readily understood some specific embodiments thereof will now be described in more detail, by way of example, with reference to the accompanying drawings in which.

Figure 8A:
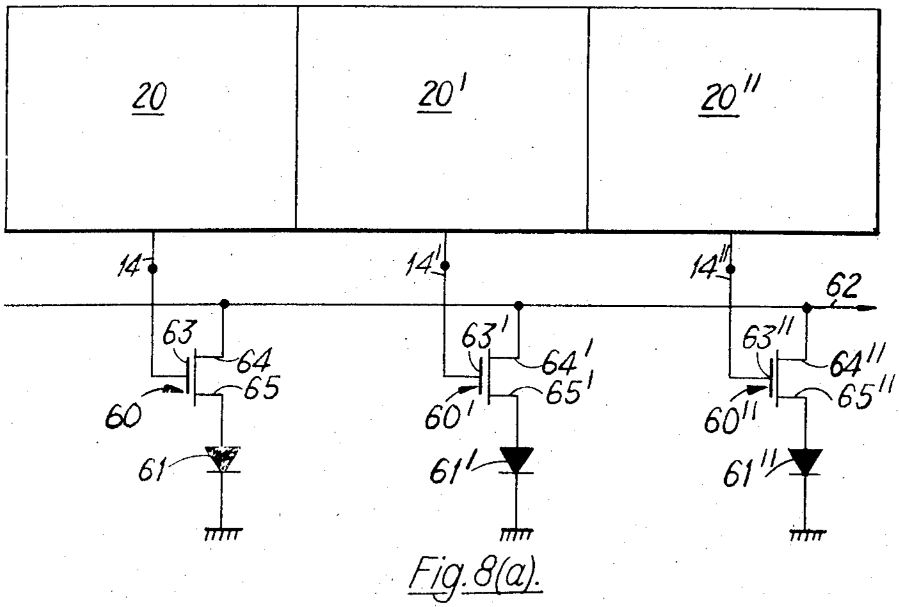
Figure 8B:
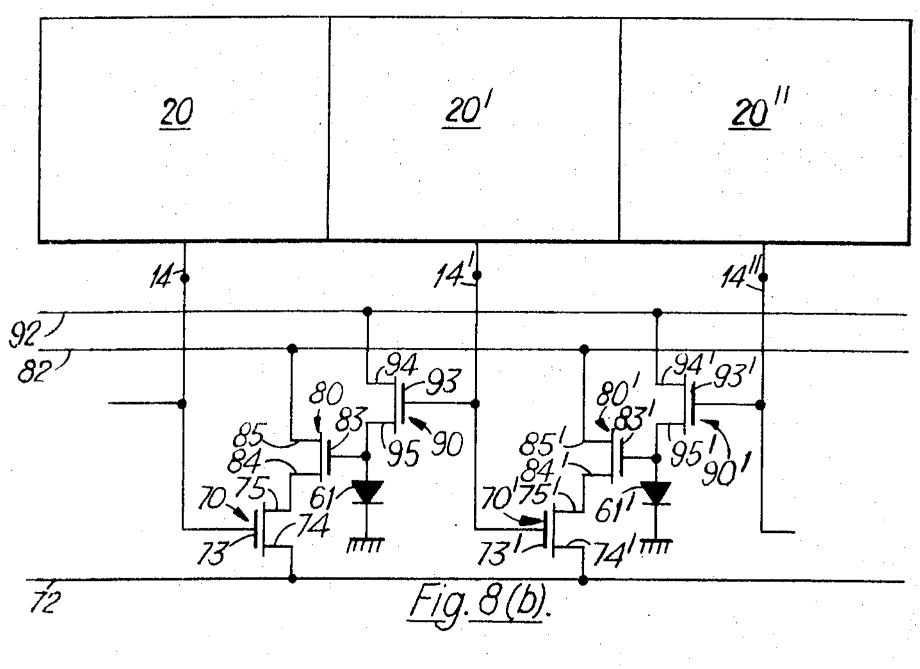

FIG. 8*a* is a circuit diagram showing schematically a first arrangement in which a shift register embodying the invention is used for the sequential scanning of an array of photodiodes; and FIG. 8*b* shows a second arrangement in which a shift register embodying the invention is used for the sequential scanning of an array of photodiodes.

Figure 1:
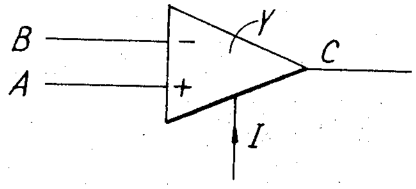
FIG. 1 illustrates schematically a single amplifying element of a shift register stage embodying the invention.

Referring now more particularly to FIG. 1, a single amplifying element Y of a shift register stage embodying the invention includes a non-inverting signal input A, an inverting signal input B, a current input I and an output C. The operation of the stage is best described by the following truth table, where "1" indicates a predetermined "high" potential at a logic 1 level and "0" indicates a predetermined "low" potential at a logic 0 level.

| I | A | B | C |
|---|---|---|---|
| 0 | 1 | 0 | 0 |
| 0 | 0 | 1 | 0 |
| 0 | 0 | 0 | + |
| 0 | 1 | 1 | 0 |
| 1 | 1 | 0 | 1 |
| 1 | 0 | 1 | 0 |
| 1 | 0 | 0 | + |
| 1 | 1 | 1 | 1 |

+ output C can store its previous logic state with the inputs A, B and I in this condition.

Figure 2:
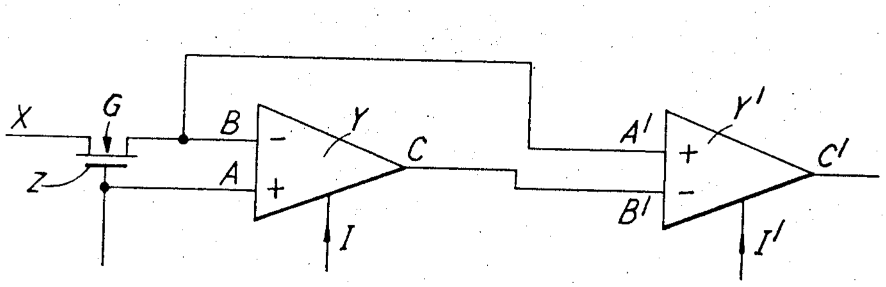
FIG. 2 illustrates schematically a shift register stage embodying to the invention and including two amplifying elements as shown in FIG. 1.

Referring now to FIG. 2, two such amplifying elements Y and Y′ are interconnected to form a shift register stage by connecting the inverting signal input B of the first amplifying element Y to the non-inverting signal input A′ of the second element Y′ and connecting the output C of the first element to the inverting signal input B′ of the second element. A controlled gate G at the stage input is connected to the inverting signal input B of the first amplifying element Y to feed a pulse or logic stage to be shifted through the stage, a control electrode 2 of such gate G being connected to the non-inverting signal input A. The stage output is constituted by the output node C′ of the second amplifying element Y′.

Figure 3:
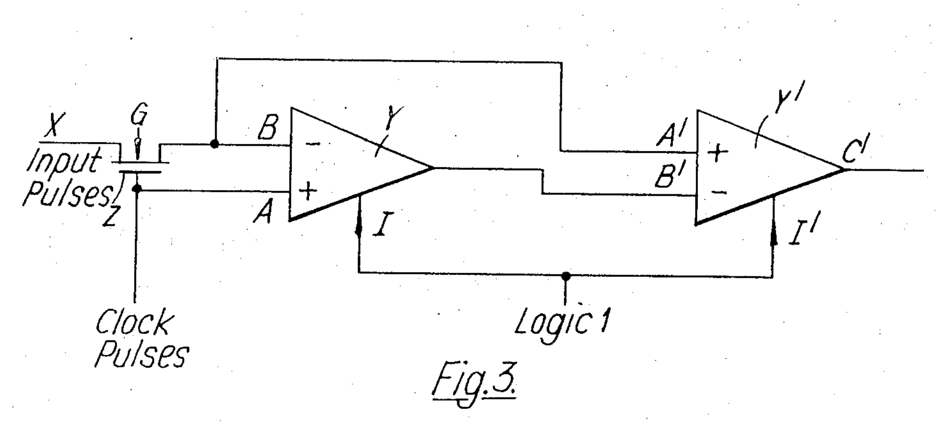
FIG. 3 illustrates a first mode in which the register stage of FIG. 2 may be operated.
Figure 4:
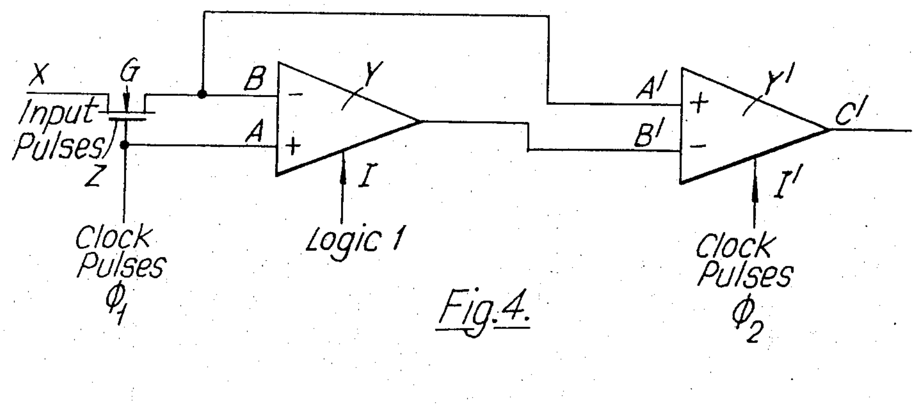
FIG. 4 illustrates a second mode in which the register stage of FIG. 2 may be operated.
Figure 5:
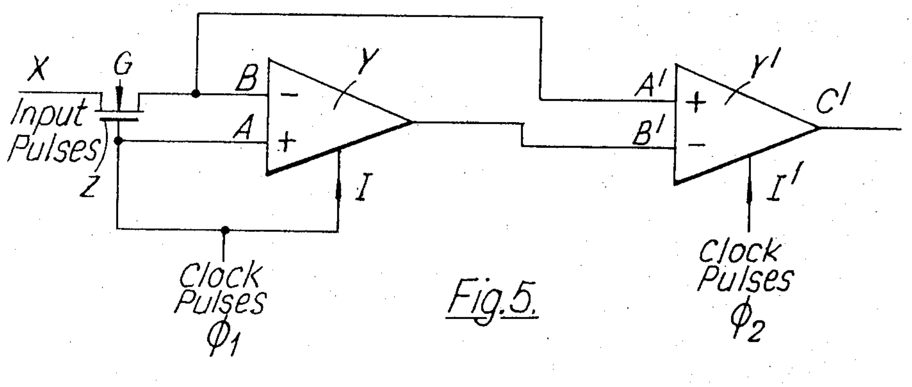
FIG. 5 illustrates a third mode in which the register stage of FIG. 2 may be operated.

The stage described above with reference to FIG. 2 may be operated under various conditions as illustrated in FIGS. 3 to 5 to function as a shift register stage.

In a first operational mode (FIG. 3) a series of clock pulses providing a succession of high potentials at the logic 1 level are applied to the non-inverting signal input A of the first element Y while constant high potential is applied to each of the current inputs I and I′. In this case, if the gate G controls the application of input pulses from stage input X to the inverting signal input B in synchronism with the clock pulses applied to input A, the operation of the stage is illustrated by the following truth table:

| X | A | B,A′ | C,B′ | C′ |
|---|---|---|---|---|
| 0 | 0 | 0 | 1* | 0 |
| 1 | 0 | 0 | 1* | 0 |
| 1 | 1 | 1 | 1 | 1 |
| 1 | 0 | 1+ | 0 | 1 |
| 0 | 0 | 1+ | 0 | 1 |
| 0 | 1 | 0 | 1 | 0 |
| 0 | 0 | 0 | 1+ | 0 |

* indicates a stored state, assumed to be logic 1.
+ indicates a stored state, defined in the preceding time interval.

When signal input A goes high (logic 1) the high is transmitted from input X to output C. The high on input B is removed through the input gate G when input A next goes high. The stage is then ready to receive the next input pulse in synchronism with the next high on input A. In a register comprising a plurality of stages operating in this mode, non-overlapping clock pulses must be applied to adjacent stages in the register to avoid propagation of an input pulse applied to the input of the register straight through to the output of the register.

In a second operational mode (FIG. 4), two series of non-overlapping clock pulses $\phi_1$ and $\phi_2$ providing a succession of high potentials are respectively applied to the non-inverting signal input A of the first amplifying element Y and the current input I′ of the second element Y′, the current input I of the first element Y being retained at the high potential. In this mode, the operation of the stage is illustrated by the following truth table.

| X | A | I′ | B,A′ | C,B′ | C′ |
|---|---|---|---|---|---|
| 0 | 0 | 0 | 0 | * | 0 |
| 1 | 0 | 0 | 0 | * | 0 |
| 1 | 1 | 0 | 1 | 1 | 0 |
| 1 | 0 | 0 | 1+ | 0 | 0 |

-Continued

| X | A | I' | B,A' | C,B' | C' |
|---|---|---|---|---|---|
| 0 | 0 | 0 | 1+ | 0 | 0 |
| 0 | 0 | 1 | 1+ | 0 | 1 |
| 0 | 0 | 0 | 1+ | 0 | 0 |
| 0 | 1 | 0 | 0 | 1 | 0 |
| 0 | 0 | 0 | 0 | 1+ | 0 |

* It is immaterial which state this input or output is in, the output C' remains at zero.
+ indicates a stored state, defined in the preceding time interval.

When input A goes high (logic 1), the input high at X is transmitted to B and A' through the input gate G. Output C and input B' also go high but output C' remains low. The high inputs on B and A' remains when input A then returns to low, but output C and input B' return to low with input A. When input I' subsequently goes high, the high on inputs B and A' is transmitted to the output C', so that there is a delay in shifting the input high at X to the output C'. The high inputs on B and A' is removed through the input gate G when input A next goes high.

In a third operational mode (FIG. 5), a first series of clock pulses $\phi_1$ providing a succession of high potentials is applied to both the non-inverting signal input A and the current input I of the first amplifying element Y. A second series of clock pulses $\phi_2$ which do not overlap the first series $\phi_1$ is applied to the current input I' of the second amplifying element Y'. In this mode, the operation of the stage is illustrated by the following truth table.

| X | A,I | I' | B,A' | C,B' | C' |
|---|---|---|---|---|---|
| 0 | 0 | 0 | 0 | * | 0 |
| 1 | 0 | 0 | 0 | * | 0 |
| 1 | 1 | 0 | 1 | 1 | 0 |
| 1 | 0 | 0 | 1+ | 0 | 0 |
| 0 | 0 | 0 | 1+ | 0 | 0 |
| 0 | 0 | 1 | 1+ | 0 | 1 |
| 0 | 0 | 0 | 1+ | 0 | 0 |
| 0 | 1 | 0 | 0 | 1 | 0 |
| 0 | 0 | 0 | 0 | 1+ | 0 |

* It is immaterial which state this input or output is in, the output C' remains at zero.
+ indicates a stored state, defined in the preceding time interval.

In this mode, the sequence of operations is the same as shown in the preceding truth table for the second mode except that input I alternates with input A.

It will be appreciated of course that a high potential, corresponding to a logic 1 state, may refer to a positive or negative potential.

Figure 6:
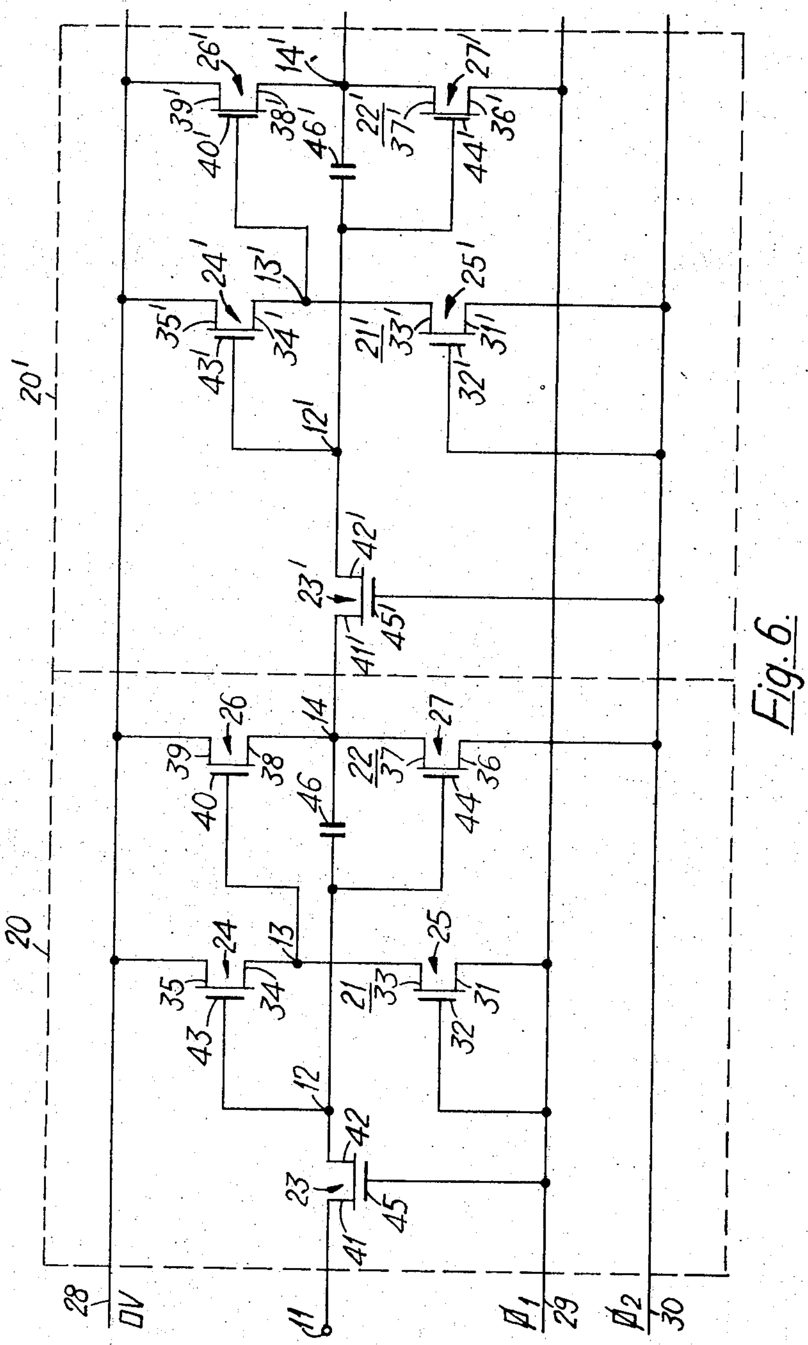
FIG. 6 is a circuit diagram of one form of shift register according to the invention.

FIG. 6 illustrates the circuitry of two stages 20, 20' of an embodiment of shift register according to the invention which is formed on a substrate as an integrated circuit and is connected to operate in the third operational mode described above. In the two stages 20, 20' like parts are indicated by like reference numerals, with the addition of a prime in the case of stage 20'. Each stage 20, 20' comprises first and second amplifying elements 21, 21' and 22, 22' and an input gate 23, 23'.

Referring to register stage 20, the first and second amplifying elements 21 and 22 include respective pairs 24, 25 and 26, 27 of *p*-channel, enhancement mode MOS transistors, the transistors 24 and 25 being connected in series between an earth rail 28 and a rail 29 receiving a first series of clock pulses $\phi_1$, and the transistors 26 and 27 being connected in series between the rail 28 and a rail 30 receiving a second series of clock pulses $\phi_2$ which do not overlap the clock pulses $\phi_1$. More particularly, the transistor 25 has its source 31 and its gate 32 connected to the rail 29 and its drain 33 connected to the source 34 of transistor 24 whose drain 35 is connected to earth rail 28, and the transistor 27 has its source 36 connected to the rail 30 and its drain 37 connected to the source 38 of transistor 26 whose drain 39 is connected to rail 28.

The gate 40 of transistor 26 is connected to junction 13 between the drain 33 of transistor 25 and the source 34 of transistor 24. The input gate 23, which is also a p-channel, enhancement mode MOS transistor, has its source 41 connected to input node 11 of stage 20 and its drain 42 connected via node 12 to the gate 43 of transistor 24 and to the gate 44 of transistor 27. The gate 45 of transistor 23 is connected to the rail 29, and a capacitor 46 is connected between the drain 42 of transistor 23 and node 14 at the junction between the transistors 26 and 27.

The gate 43 of transistor 24 forms the inverting signal input of the amplifying element 21, the gate 32 of transistor 25 forms the non-inverting signal input of element 21, the source 31 of transistor 25 forms the supply current input of element 21 and the junction 13 between the transistors 24 and 25 forms the signal output of the elements 21. Similarly, the gate 40 of transistor 26 forms the inverting signal input of amplifying element 22, the gate 44 of transistor 27 forms the non-inverting signal input of the element 22, the source 36 of transistor 17 forms the supply current input of the element 12 and the node 14 between the transistors 26 and 27 forms the signal output of the element 12 which is also the signal output node of the stage 20.

The output node 14 of stage 20 is connected to the input transistor 23' of the second stage 20' which is constructed in the same manner as stage 20, except that the gate 45' of input transistor 23' is connected not to the rail 29 but to the rail 30 which is also connected to the gate 32' and source 31' of transistor 25', whilst transistor 27' has its source 36' connected to the rail 29 instead of rail 30 as is the case with transistor 27. In a third stage (not shown) the arrangement would again be reversed so that a stage identical to that of the first stage 20 is produced and the alternate biasing of the input gates 23, 23' and transistors 25, 25' and 27, 27' is repeated in the remaining stages of the shift register.

The nodes 11, 12, 13 and 14 of register stage 20 will have one of five quasi-static potentials in normal operation, namely:

1. Earth, or low, typically 0V.
2. Intermediate, typically −12V.
3. High, typically −24V.
4. Clock high, typically −30V.
5. Extra high, typically −40V.

These values are given by way of example only and will of course vary with processing parameters, design detail and operating conditions. The values given here are suitable when a threshold voltage of about −5 volts for the MOS transistors is required.

Figure 7:
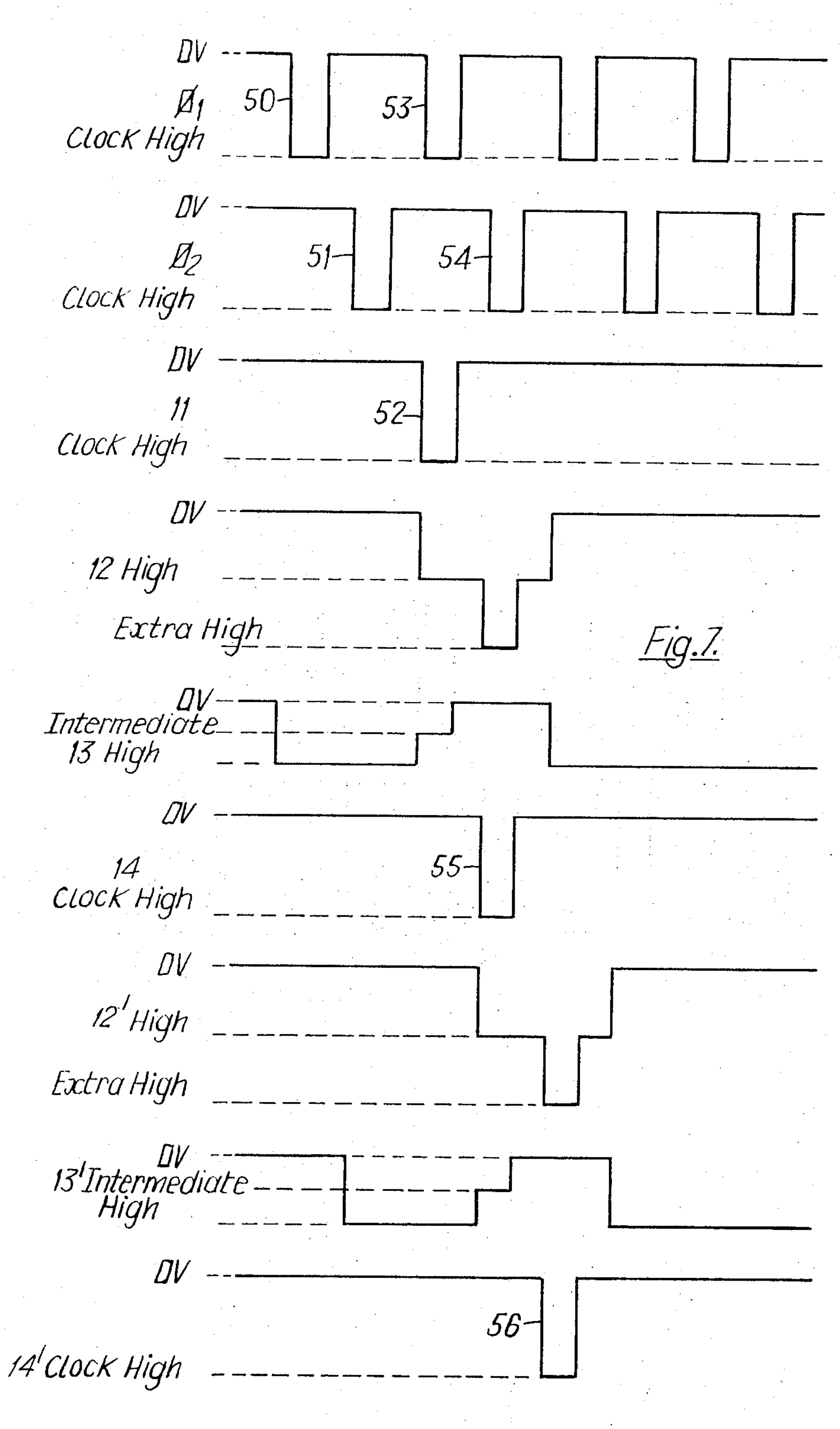
FIG. 7 is a timing diagram illustrating the potentials on various nodes of the circuit shown in FIG. 6.

The operation of the FIG. 6 circuitry will now be described with reference to the waveform diagram of FIG. 7. In operation of the shift register, the input node 11 is normally at zero potential or low corresponding to the logic 0 state and a pulse corresponding to a logic state 1 to be transferred through the register is fed to the input node 11, whilst rails 29 and 30 have non-overlapping alternate clock pulses $\phi_1$ and $\phi_2$ applied thereto to transfer them from the logic 0 state at zero potential to the logic 1 state known as the clock high potential.

In the following it is assumed for simplicity that the MOS transistors of the register are on (i.e. rendered conducting) when the gate potential is other than low (zero potential) and off (rendered non-conducting) when the gate is at zero potential.

Assuming initially that the input node 11 is low, then the application of a $\phi_1$ clock pulse 50 to the rail 29 will turn input transistor 23 on so that node 12 will assume the low present on the input node 11 and transistor 24 is off. Transistor 25, however, is turned on by the clock pulse $\phi_1$ applied to its gate 32 and conducts so that node 13 becomes high thereby applying a high to the gate 40 of transistor 26 which is thus turned on. Output node 14 is thus connected to rail 28 through transistor 26 and is low because transistor 27 is off at this time. On removal of the $\phi_1$ clock pulse 50, the nodes 12, 13 and 14 retain the above states adopted during the period of application of the clock pulse $\phi_1$ and the application of the following $O_2$ clock pulse 51 to the rail 20 does not result in any change in the potential of the nodes.

When subsequently an input pulse 52 at clock high is applied to input node 11 in synchronism with a $\phi_1$ pulse 53 applied to rail 29, the transistor 23 is again turned on causing node 12 to become high together with the gates 43 and 44 of transistors 24 and 27, turning such transistors on. As the gate 32 of transistor 25 is also connected to the rail 29, transistor 25 is also turned on and current flows between rail 29 and rail 28 via transistors 24 and 25. This causes the potential of node 13 to drop to the intermediate value which however keeps transistor 26 on. At this stage both transistors 26 and 27 are on but no current is drawn through these transistors since the rail 30 to which the source 36 of transistor 27 is connected is at zero potential and node 14 remains low.

The pulses are then removed from rail 29 and the node 11 turning transistors 23 and 25 off. The node 12 remains high so that transistors 24 and 27 are held on, but node 13 is discharged to zero potential through transistor 24 thereby turning off transistor 26.

A $\phi_2$ clock pulse 54 is next applied to rail 20 causing a high to be applied to source 36 of transistor 27. Transistor 27 accordingly now conducts causing the output node 14 to become high to deliver an output pulse 55 corresponding to input pulse 52 but delayed relative to pulse 52. The capacitor 46 couples this change to node 12 which then moves from its previous high state towards an extra high state. Because of the threshold voltage required for transistor 27, output node 14 would not reach the clock high potential representing the logic 1 state applied to input 11 with only a high potential applied to its gate 44 from node 12, so that the extra high potential is fed back by capacitor 46 to counteract the threshold voltage and allow node 14 to reach clock high. At this time transistor 23' of the next stage 20' is turned on by the clock pulse $\phi_2$ applied to its gate 45' from rail 30 and thus the high potential at output node 14 is transferred to the node 12' in the same fashion as the pulse was originally transferred into the first stage 20.

When the clock pulse $\phi_2$ is removed from the rail 30, the transistor 27 remains conducting by virtue of the charge stored on capacitor 46 so that the node 14 reverts back to its low state terminating output pulse 55 and node 12 reverts back to its high state from its extra high state. When the next clock pulse is applied to the rail 29, input node 11 is low, the transistor 23 is turned on and the nodal point 12 reverts to its low state thereby switching off transistors 24 and 27. The high is retained at node 13 as transistor 25 is turned on, and consequently transistor 26 is turned on retaining node 14 in its low state.

The pulse 55 transferred from output node 14 to node 12' during the application of $\phi_2$ clock pulse 54 is subsequently processed in the stage 20' to produce an output pulse 56 at output node 14', the operation of stage 20' being identical to that of stage 20 except that the roles of clock pulses $\phi_1$ and $\phi_2$ are reversed.

The embodiment described in detail above satisfies the following conditions:

1. Under quiescent conditions, with logic 0 (low) state on the output, each stage draws negligible current,
2. The presence of a logic 1 state on the output of one of the stages causes that stage only to draw an amount of current from the supply commensurate with a short response time, i.e. a high maximum operating speed,
3. The removal of the logic 1 state from the output causes the stage to revert to its initial state, drawing negligible current from the supplies.

FIGS. 8(a) and 8(b) illustrate arrangements in which a shift register embodying the invention is used to sequentially scan a linear array of photo-diodes. Although only three photo-diodes and register stages are shown in FIGS. 8(a) and 8(b), it will be appreciated that an array comprising any number of photo-diodes can be scanned using a register having a number of stages at least equal to the number of diodes in the array.

Referring firstly to FIG. 8(a), the output node 14, 14', 14'' of each register stage 20, 20', 20'' is connected to control a respective MOS transistor switch 60, 60', 60'', the purpose of which is to connect a respective photo-diode 61, 61', 61'' in the array to a common output rail 62. Each transistor 60, 60', 60'' has its gate 63, 63', 63'' connected to the output node 14, 14', 14'' of the respective register, its source 64, 64', 64'' connected to the rail 62 which is at a negative potential, and its drain 65, 65', 65'' connected to the anode of the respective photo-diode 61, 61', 61''. The cathode of each photo-diode is connected to earth.

In operation, the photodiodes 61 are sequentially scanned in successive scanning cycles, each such scanning cycle involving the transfer of a single logic 1 state through the shift register. The presence of a logic 1 state on the output 14 of a register stage 20 causes the respective MOS transistor 60 to turn on, thereby connecting the anode of the photo-diode 61 to the rail 62 and charging the self-capacitance of the diode 61 to a potential dependent upon that of rail 62. Between successive samplings of the diode 61 charge is drained from the diode capacitance by the photo-current flowing in the diode, and recharging of the diode capacitance at each sampling thereof produces on rail 62 a pulse which corresponds to the amount of charge lost by the diode capacitance since the last sample was taken and which therefore is significant of the integral of the illumination incident on the diode during the period between the successive samplings. As the logic 1 state is propagated through the register during each sampling cycle, each photodiode in the array is connected in succession to the common output rail 62 so that a sequence of output pulses from the photodiodes is delivered on the rail 62.

In the arrangement of FIG. 8(b), the output node 14 of register stage 20 is connected to the gate 73 of an MOS transistor 70 having its source 74 connected to a common output rail 72 at a negative potential and its drain 75 connected to the source 84 of an MOS transistor 80 whose drain 85 is connected to an earth rail 82. The cathode of photo-diode is connected to earth and its anode is connected firstly to the gate 83 of transistor 80 and secondly to the drain 95 of a transistor 90 having its source 94 connected to a common charging rail 92 at a negative potential. The gate 93 of transistor 90 is connected to the output node 14', of the next register stage 20'.

When a logic 1 state is propagated through the register in the arrangement of FIG. 8(b), the presence of a logic 1 state on the output node 14 of a register stage 20 causes the respective MOS transistor 70, which is normally off, to turn on and a current pulse flows between rails 72 and 82 through the MOS transistors 70 and 80, such pulse being dependent on the potential applied to the gate 83 of transistor 80 by photo-diode 61. This gate potential is significant of charge lost from the diode capacitance since the last sampling of the diode and is therefore significant of the integral of the illumination incident on the photo-diode 61 between successive samplings. When the logic 1 state shifts to the output node 14' of the next register stage 20' the transistor 90 is turned on to connect diode 61 to the rail 92 to recharge the same. At the same time the logic 1 state on output node 14' is applied to gate 73' of transistor 70 to provide an output pulse corresponding to photo-diode 61'. Thus as the logic 1 state is propagated through the register, pulses corresponding to each photo-diode in the array are delivered in sequence on the rail 72, each diode being reset by the appearance of the logic 1 state on the output node of the succeeding register stage.

It is clear from the foregoing that the shift register described above is ideally suited to this photo-diode scanning application, since it satisfies the condition for minimum power dissipation, namely the presence of a single logic 1 state in the register at any one time.

I claim:

1. A shift register stage including:
- first and second amplifying elements;
- an inverting signal input on each of said first and second elements;
- a non-inverting signal input on each of said first and second elements, the non-inverting signal input of said second element being connected to the inverting signal input of said first element;
- a supply current on each of said first and second elements;
- an output on each of said first and second elements, the output of said first element being connected to the inverting signal input of said second element, and the output of said second element being the output of the stage;
- switch means directly connected between the inverting input of said first element and an input node of the shift register stage for selectively establishing a current path between the inverting input of said first element and the input node; and,
- a control electrode on said switch means connected to said non-inverting input of said first element and to a control source to control the application of a logic signal to be shifted through the stage to the inverting signal input of said first element from the input node of the shift register stage.

2. A shift register stage according to claim 1, including:
- a clock source providing a series of clock pulses at a predetermined level of potential, said clock source being connected to the control electrode of said switch means and to the non-inverting signal input of said first element; and
- a current source of constant potential at the predetermined level connected to the current input of each of said first and second elements.

3. A shift register stage according to claim 2, including:
- a first clock source providing a first series of clock pulses at a predetermined level of potential, said first clock source being connected to the control electrode of said switch means and to the non-inverting signal input of said first element;
- a second clock source providing a second series of clock pulses at the predetermined level of potential in non-overlapping relationship with the pulses of the first series, said second clock source being connected to the current input of the second element; and
- a current source of constant potential at the predetermined level connected to the current input of said first element.

4. A shift register stage according to claim 3, including:
- a first clock source providing a first series of clock pulses at a predetermined level of potential, said first clock source being connected to the control electrode of said switch means, to the non-inverting input signal of said first element, and to the current input of said first element; and
- a second clock source providing a second series of clock pulses at the predetermined level of potential in non-overlapping relationship with the pulses of the first series, said second clock source being connected to the current input of said second element.

5. A shift register according to claim 4, wherein each of said first and second amplifying elements includes first and second MOS transistors connected in series.

6. A shift register according to claim 5, including:
- a gate electrode of said first transistor constituting the inverting signal input of the amplifying element;
- a gate electrode of said second transistor constituting the non-inverting signal input of the amplifying element; and
- a current-carrying electrode of said second transistor constituting the current input of the amplifying element;
- the output of the amplifying element being constituted by the junction between said first and second transistors.

7. A shift register according to claim 6, wherein said switch means comprises an MOS transistor having its current carrying-electrodes respectively connected to the inverting signal input and the input node of the stage and having its gate electrode connected to the non-inverting signal input of said first element.

8. A shift register stage according to claim 7, including capacitive means connected between the output of the second amplifying element and the non-inverting signal input thereof to provide positive feedback from such output node to such non-inverting signal input.

* * * * *